Feb. 4, 1964     D. H. PRUTTON     3,120,148
NAIL HAVING A SHEARING POINT
Filed Nov. 7, 1960

INVENTOR.
DANIEL H. PRUTTON
BY
ATTORNEYS

United States Patent Office 3,120,148
Patented Feb. 4, 1964

3,120,148
NAIL HAVING A SHEARING POINT
Daniel H. Prutton, 5305 W. 130th St., Cleveland, Ohio
Filed Nov. 7, 1960, Ser. No. 67,553
2 Claims. (Cl. 85—21)

The invention relates in general to nails and in particular to a nail for use in easily splitable materials which nail has increased holding power.

Nails have been used in the past which have a blunt end for driving into hard wood and the like so that the nail punches or shares a hole in the wood rather than splitting it as might be the case in easily splitable wood if a pointed nail were used. Often this requires a second operation to especially blunt previously manufactured nails with pointed ends and this additional operation requires extra time and of course is expensive. Also, such nails have been of only ordinary holding power which is not satisfactory for many applications. In uses such as nailing oak floors, for example, the oak tends to split where nailed and also the repeated walking on the floor in use loosens the nails so that the floor squeaks. Therefore, a nail with greater holding power is desired and one which will not split hard wood and the like.

Accordingly, an object of the invention is to provide a nail which will overcome the above shortcomings.

Another object of the invention is to provide a nail which has means to shear the material into which driven and has holding means to increase the holding power after driven home.

Another object of the invention is to provide a nail with a shearing wall at the driving end and with a holding wall in a section removed from the driving end.

Another object of the invention is to provide a nail for use in compressible materials which is easily manufactured on commercially available machinery.

Other objects and a fuller understanding of this invention may be had by referring to the following description and claims, taken in conjunction with the accompanying drawings, in which:

Figure 1:
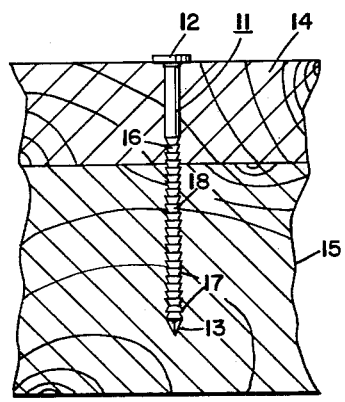
FIGURE 1 is a sectional view of boards held together with a nail incorporating the invention.
Figure 2:
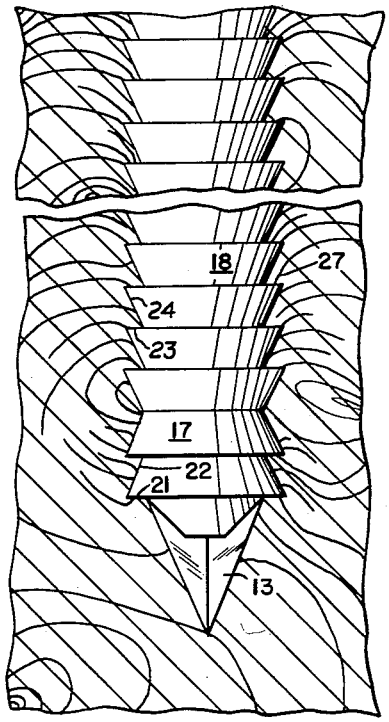
FIGURE 2 is an enlarged longitudinal view of the driving end of the nail embedded in wood.

FIGURE 1 shows the complete nail 11 having a head 12 and a shank 16 with a pointed driving end 13. FIGURE 1 shows this nail holding a board 14 onto another board 15. The nail has first and second portions 17 and 18, respectively, in the shank 16, with the first portion being contiguous with the driving end 13. FIGURE 2 shows enlarged the first portion and a part of the second portion 18. The first portion has first or shearing walls 21 and second or joining walls 22. The second portion 18 has third or shoulder walls 23 and fourth or joining walls 24. In the first portion 17 the first and second walls 21 and 22 define a series of annular grooves with the first walls 21 being generally perpendicular to the axis 25 of the nail shank 16. In the second portion 18 the third and fourth walls 23 and 24 define a series of annular grooves with the third walls 23 being generally perpendicular to the axis 25. In the first portion 17 the joining walls 22 point toward the driving end 13 and in the second portion 18 the joining walls 24 point toward the head 12. Accordingly, the shearing walls 21 face toward the point and the shoulder walls 23 face toward the head.

Only a few of the shearing walls 21 are shown in the drawing since only a few have been found to be necessary. A considerably greater number of shoulder walls 23 are provided so that regardless of the thinness of the first board 14 there will be a great number of these shoulder walls 23 embedded in the second board 15.

Figure 3:
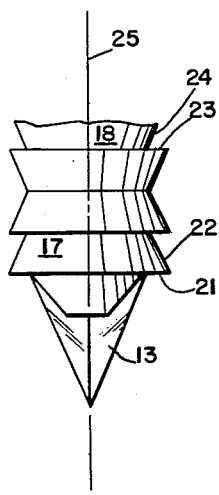
FIGURE 3 is an enlarged partial view similar to FIGURE 2 of the driving end of the nail.
Figure 4:
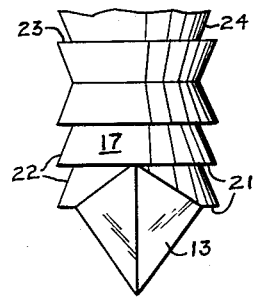
FIGURE 4 is an enlarged partial longitudinal view taken at right angles to the view FIGURE 3.

The FIGURES 3 and 4 show views taken at 90 degrees relative to each other and show that the point 13 may be more pointed in one view, namely FIGURE 3. This is a typical shape for a pointed nail made on a nail machine having cut-off dies acting in opposition in a plane.

In use the nail is driven in any usual manner and first the pointed driving end 13 gradually separates and partially pierces the fibers of the wood or other compressible material into which it is driven. These fibers are partially compressed, generally radially outwardly and then the shearing walls 21 shear these partly compressed fibers. The most forward of the shearing walls 21 will do the bulk of this shearing but as shown in FIGURES 3 and 4. part of this shearing is done on the foremost wall 21 and the remainder on the next rearward shearing wall. After the nail has been driven home, the second portion 18 provides the greater holding power of the nail 11. This is because the radially compressed fibers now expand and move radially inwardly to engage the shoulder walls 23 as at 27. Because of these many shoulder walls 23, the wood fibers are securely gripped. The wood fibers as at 27 have been driven forwardly, that is in the direction of the pointed end 13 and part of these fibers have been sheared off but then after the nail has been driven home the resiliency of the radially compressed and longitudinally displaced fibers at 27 will grip the shoulder walls 23 with superior holding power.

The nail 11 is designed for ease of manufacture and ordinary pointed nails made on any conventional nail making machine may used. The grooves formed by the walls 21 to 24 may readily be rolled into the exterior surface of the shank 16 on many types of machines such as thread rolling machines for bolts and screws and the like. Such machinery has high speed capacity for low cost manufacture.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A nail for use in fibrous materials and the like, comprising, a shank and a head, a pointed driving end on said shank opposite said head, first and second portions on said shank with said first portion adjacent said driving end, a plurality of annular shearing walls of equal diameters on said first portion each generally perpendicular to the axis of said shank and facing said driving end, a shearing wall being next adjacent to the base of said pointed end, conical joining walls on said first portion joining the crest of one shearing wall with the root of the next shearing wall, a plurality of annular shoulder walls of equal diameters on said second portion each generally perpendicular to said axis and facing said head, and conical joining walls on said second portion joining the crest of one shoulder wall with the root of the next shoulder wall, said shearing wall adjacent said pointed end having a diameter larger than the base of said pointed end and substantially equal to the diameter of said shoulder walls, the juncture of said first and second portions being defined by a V-shaped annular groove formed by the intersection of the oppositely facing joining walls, whereby in use the driving end partially separates and radially compresses the fibers of the material into which the nail is driven with said shearing walls shearing the partially compressed fibers and then said shoulder walls grip the fibers after partial expansion thereof.

2. A nail for use in compressible materials and the like, comprising, a shank and a head, a pointed driving end on said shank opposite said head, said shank having first and second portions with said first portion contiguous with said driving end, said first portion comprising at least one annular groove having a conical wall and an annular first wall contiguous to a part of said driving end and generally perpendicular to the axis of said shank and facing toward said driving end, said first walls having a diameter larger than the base of said pointed driving end whereby said pointed driving end partially pierces and separates the material into which the nail may be driven to compress the material generally radially outwardly and whereby said first wall provides a generally right angle shoulder for bluntly driving through a portion of the radially compressed material to shear the material in advance of the shank second portion, said second portion of said shank having a series of annular grooves each having a conical wall and an annular second wall generally perpendicular to said axis and facing toward said head whereby said second walls provide generally right angle shoulders of equal diameters to grip the material upon radially inward expansion thereof, said first and second walls having substantially equal diameters, the juncture of said first and second portions being defined by a V-shaped annular groove formed by the intersection of the oppositely facing conical walls thereof.

References Cited in the file of this patent

UNITED STATES PATENTS

| | | |
|---|---|---|
| 1,948,889 | Simon | Feb. 27, 1934 |
| 2,226,006 | Maze | Dec. 24, 1940 |
| 2,967,448 | Hallock | Jan. 10, 1961 |